United States Patent
Kumar et al.

(10) Patent No.: US 8,547,840 B1
(45) Date of Patent: Oct. 1, 2013

(54) BANDWIDTH ALLOCATION OF BURSTY SIGNALS

(75) Inventors: Alok Kumar, Fremont, CA (US);
Anand Raghuraman, Campbell, CA (US); Uday Naik, Fremont, CA (US);
Aspi Siganporia, Saratoga, CA (US);
Sushant Jain, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 306 days.

(21) Appl. No.: 13/018,905

(22) Filed: Feb. 1, 2011

(51) Int. Cl.
*H04L 12/26* (2006.01)

(52) U.S. Cl.
USPC ........... 370/231; 370/233; 370/234; 370/236; 370/237; 370/253; 370/395.21; 370/395.41; 370/395.42

(58) Field of Classification Search
USPC ............... 370/252, 253, 229–237, 395.41, 370/395.21, 395.42
See application file for complete search history.

(56) References Cited

U.S. PATENT DOCUMENTS

| | | | | |
|---|---|---|---|---|
| 5,917,804 A | * | 6/1999 | Shah et al. | 370/230 |
| 5,943,316 A | * | 8/1999 | Davis | 370/232 |
| 2001/0038639 A1 | * | 11/2001 | McKinnon et al. | 370/468 |
| 2004/0100903 A1 | * | 5/2004 | Han et al. | 370/230 |
| 2005/0083841 A1 | * | 4/2005 | Zuberi | 370/230 |
| 2007/0047553 A1 | * | 3/2007 | Matusz et al. | 370/395.42 |
| 2008/0253321 A1 | * | 10/2008 | Gormley et al. | 370/329 |

* cited by examiner

*Primary Examiner* — Jeffrey M Rutkowski
*Assistant Examiner* — Hardikkumar Patel
(74) *Attorney, Agent, or Firm* — Lerner, David, Littenberg, Krumholz & Mentlik, LLP

(57) ABSTRACT

Bandwidth is allocated by leveraging a bursty characteristic of data transmission signals to efficiently utilize network resources. Network performance is observed over a time period to identify patterns of data transmission rates as different signals are processed. To compensate for the fact that different jobs/tasks peak at different times, the total bandwidth limit may be increased by a scaling factor. The scaling factor is calculated using information obtained by observing network performance during the time period. The scaling factor is used to increase the total bandwidth available for all jobs/tasks executing during the time period without exceeding any bandwidth limits. The data transmission rate of each job/task may then be adjusted to utilize the newly available bandwidth.

18 Claims, 7 Drawing Sheets

BANDWIDTH ALLOCATION OF BURSTY SIGNALS

BACKGROUND OF THE INVENTION

1. Field of the Invention

The invention relates generally to bandwidth allocation, and more particularly to a bandwidth enforcement policy that leverages a bursty characteristic of data transmission signals to efficiently utilize network resources.

2. Description of Related Art

Job control refers to the allocation of bandwidth to control multiple jobs accessing a network on a computer system. Proper enforcement of a bandwidth policy ensures that each job (or different tasks associated with each job) has access to adequate network resources to perform correctly.

Enforcing a network allocation policy is commonly performed by multitasking where more than one running program, or process, is present in the computer at any given time. If a process is unable to continue, its context can be stored and the computer can start or resume the execution of another process. Multitasking is usually performed by a scheduler that may interrupt and resume the execution of other processes. Typically, a driver for a peripheral device suspends execution of a current process if the device is unable to complete an operation immediately, and the scheduler places the process on its queue of sleeping jobs. The process is re-awakened when the peripheral device can complete the operation. Similar suspension and resumption may also apply to inter-process communication, where processes communicate with one another in an asynchronous manner but may need to wait for a reply.

A process that seldom interacts with peripherals or other processes may dominate network resources until the process completes or is halted by manual intervention. The result is that the system is slow to react in a timely manner. This problem may be resolved by allocating each process a period of uninterrupted execution. The process may be assigned different priorities, and the scheduler may allocate varying shares of available execution time to each process on the basis of the assigned priorities. However, network resources may not be effectively utilized because many jobs and tasks do not transfer data at a constant rate or at predictable times.

BRIEF SUMMARY OF THE INVENTION

Aspects of the invention relate generally to bandwidth allocation by leveraging a bursty characteristic of data transmission signals to efficiently utilize network resources. The signals may be job signals to be executed by a network or task signals associated with the same job and also executed by the network. Network performance is observed over a time period to identify patterns of data transmission rates as the different signals are processed. The "burstiness" of signals is identified at different intervals in the time period. Burstiness refers to the characteristic of data signals where no data (or a relatively small amount of data) is transferred for an interval and then a significantly larger amount of data is suddenly transferred. The burstiness characteristic of signals is leveraged to allocate bandwidth such that network resources are efficiently utilized.

The bandwidth allocation is performed based on the observed behavior of the signals over the course of the time period. Bandwidth is initially allocated by dividing the peak bandwidth usage by the number of jobs or tasks. To compensate for the fact that different jobs/tasks peak at different times during the time period, a total bandwidth limit may be increased by a scaling factor. The scaling factor is calculated using information obtained by observing network performance during the time period. The scaling factor is then used to increase the total bandwidth available for all jobs/tasks executing during the time period without exceeding any bandwidth limits. The data transmission rate of each job/task may be adjusted to consume the newly available network bandwidth. In some cases, a bursty portion of the data transmission signal may be increased. In other cases, a non-bursty portion of the data transmission signal may be decreased. The different data transmission signals may also be assigned a priority value such that those signals having a higher priority are adjusted to consume the newly available network resources before those signals having a lower priority.

In some embodiments, a computer-implemented method includes observing execution of data transmission signals over a predetermined time period. At least some of the data transmission signals exhibit bursty characteristics. A peak bandwidth usage of all data transmission signals and a peak bandwidth demanded by each data transmission signal are identified during the time period. The peak bandwidth usage is divided by a total number of different data transmission signals that are executing during the time period. A total bandwidth demand scaling factor is calculated using a peak of the sum of bandwidth demands and a sum of the peak bandwidth demands for the data transmission signals. A total bandwidth limit for the data transmission signals is increased using the scaling factor.

In one aspect of the invention, a bandwidth limit is initially allocated for each data transmission signal using a quotient resulting from dividing the peak bandwidth usage by the total number of different data transmission signals. The initially allocated bandwidth limit is adjusted for each data transmission signal such that a total of the adjusted bandwidth limit for all of the data transmission signals does not exceed the increased total bandwidth limit.

In some embodiments, a computer-implemented method includes observing network execution of task signals over a predetermined time period. At least some of the task signals transmit data at varying rates during the time period. Each task signal is associated with a job signal and corresponds to an action performed on the network. The job signal corresponds to a portion of a program executing on the network. A total job bandwidth limit of all task signals, a peak bandwidth job usage of all task signals, and a peak bandwidth demanded are identified by each task signal during the time period. A bandwidth limit is initially allocated for each task signal by dividing the total job bandwidth limit by a total number of different task signals that are executing during the time period. A bandwidth job limit scaling factor is calculated using a peak of a sum bandwidth demands and a sum of the peak bandwidth demands for the task signals. The total bandwidth job limit is increased by the scaling factor. The initially allocated bandwidth limit is adjusted for each task signal such that a total of the adjusted bandwidth allocation limit for all of the task signals does not exceed the increased total bandwidth job limit.

In some embodiments, a computer-implemented method comprises observing network execution of job signals over a predetermined time period. At least some of the job signals transmit data at varying rates during the time period. Each job signal corresponds to a portion of a program executing on a network. A peak bandwidth usage of all job signals and a peak bandwidth demanded by each job signal are identified during the time period. A bandwidth limit is initially allocated to each job signal by dividing the peak bandwidth usage all job signals by a total number of different job signals that are executing during the time period. A total bandwidth demand scaling factor is allocated using a peak of a sum of bandwidth demands and a sum of the peak bandwidth demands for the job signals. A total bandwidth limit for the job signals is increased using the scaling factor. The initially allocated bandwidth limit is adjusted for each job signal such that the adjusted bandwidth limit for all of the job signals does not exceed the increased total bandwidth limit.

DETAILED DESCRIPTION

Figure 1:
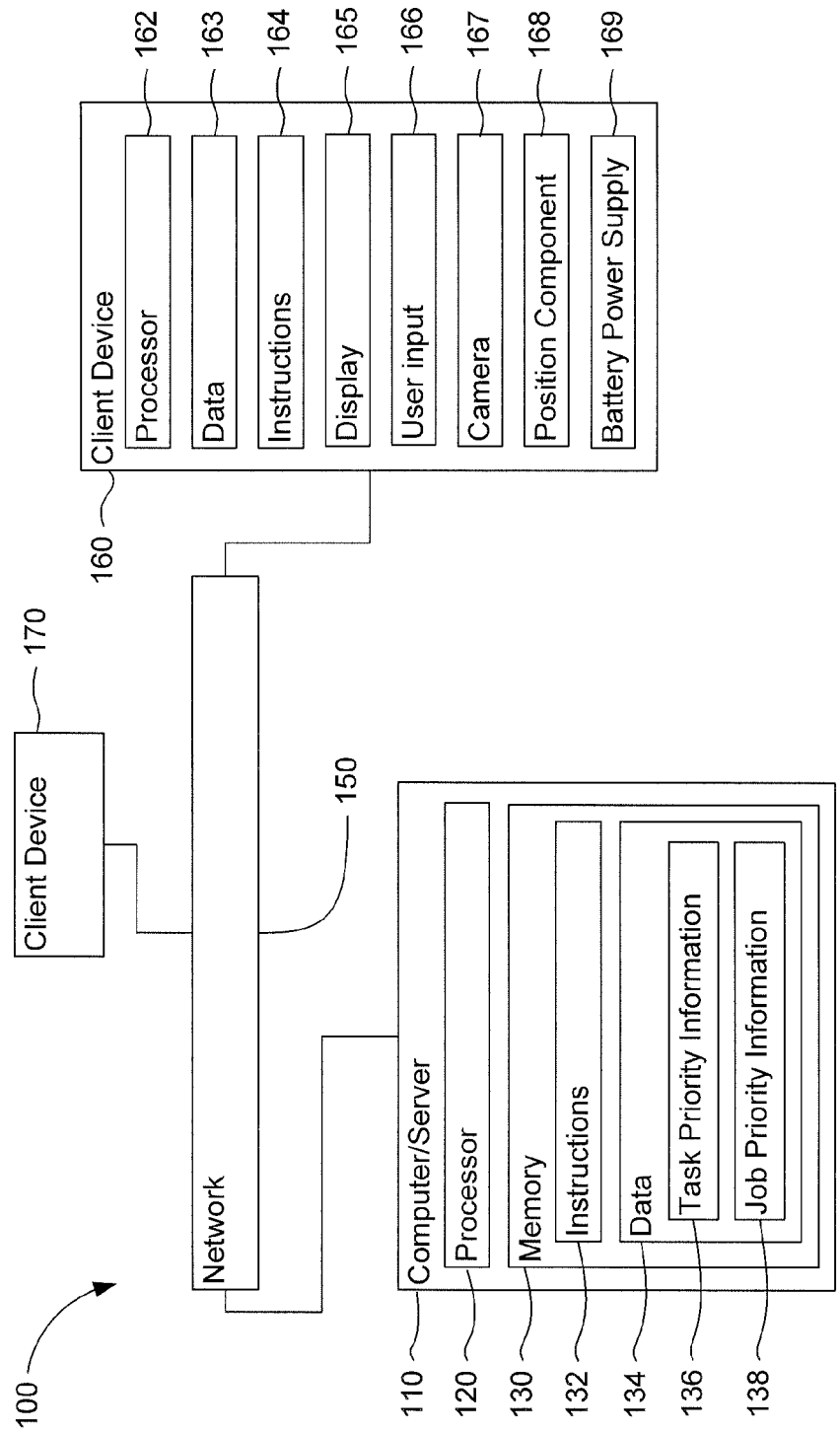
FIG. 1 is a functional diagram of a system in accordance with an aspect of the invention.
Figure 2:
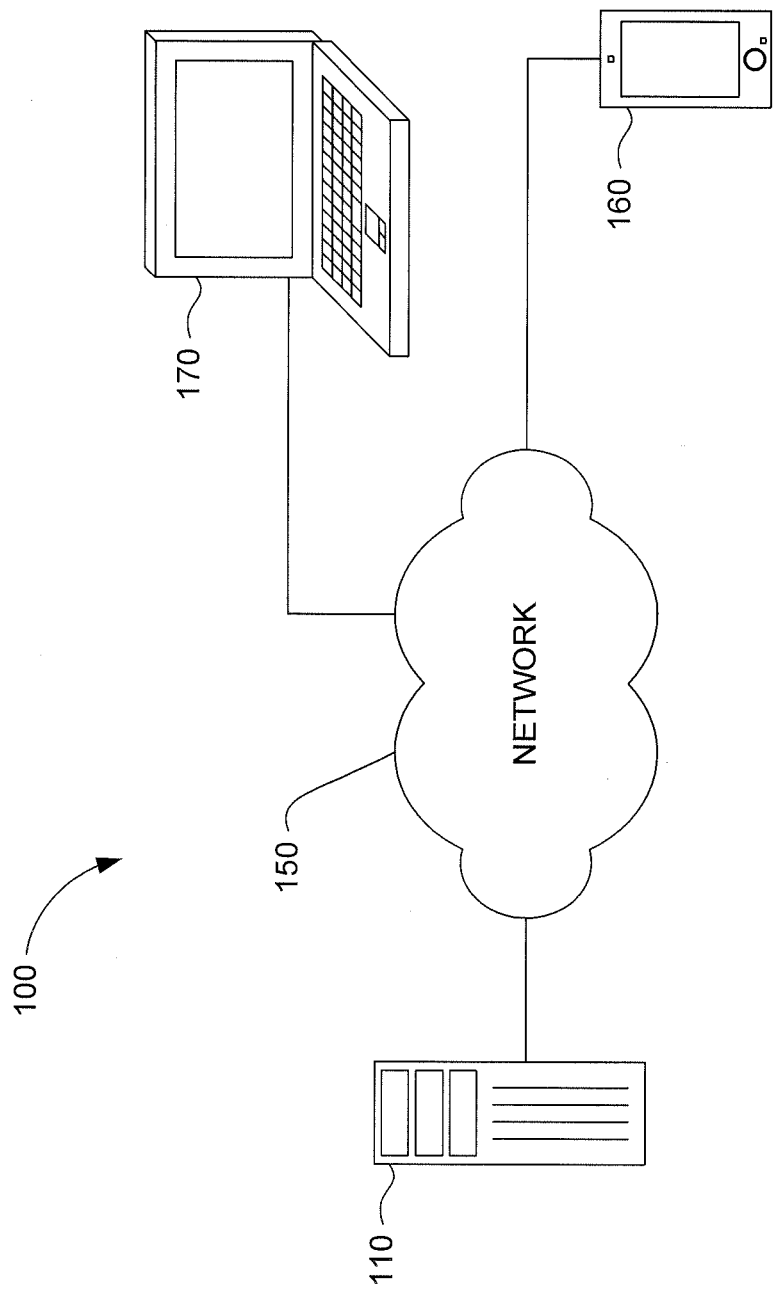
FIG. 2 is a pictorial diagram of the system of FIG. 1.

As shown in FIGS. 1-2, a system 100 in accordance with one aspect of the invention includes a computer 110 containing a processor 120, memory 130 and other components typically present in general purpose computers.

The memory 130 stores information accessible by processor 120, including instructions 132, and data 134 that may be executed or otherwise used by the processor 120. The memory 130 may be of any type capable of storing information accessible by the processor 120, including a computer-readable medium, or other medium that stores data that may be read with the aid of an electronic device, such as a hard-drive, memory card, flash drive, ROM, RAM, DVD or other optical disks, as well as other write-capable and read-only memories. In that regard, memory may include short term or temporary storage as well as long term or persistent storage. Systems and methods employing aspects of the invention may include different combinations of the foregoing, whereby different portions of the instructions and data are stored on different types of media.

The instructions 132 may be any set of instructions to be executed directly (such as machine code) or indirectly (such as scripts) by the processor 120. For example, the instructions may be stored as computer code on the computer-readable medium. In that regard, the terms "instructions" and "programs" may be used interchangeably herein. The instructions may be stored in object code format for direct processing by the processor 120, or in any other computer language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the architecture is not limited by any particular data structure, the data may be stored in computer registers, in a relational database as a table having a plurality of different fields and records, XML documents or flat files. The data may also be formatted in any computer-readable format.

The processor 120 may be any conventional processor, such as processors from Intel Corporation or Advanced Micro Devices. Alternatively, the processor 120 may be a dedicated controller such as an ASIC. Although FIG. 1 functionally illustrates the processor and memory as being within the same block, it will be understood by those of ordinary skill in the art that the processor and memory may actually comprise multiple processors and memories that may or may not be stored within the same physical housing. For example, memory may be a hard drive or other storage media located in a server farm of a data center. Accordingly, references to a processor or computer will be understood to include references to a collection of processors or computers or memories that may or may not operate in parallel.

The computer 110 may be at one node of a network 150 and capable of directly and indirectly receiving data from other nodes of the network. For example, computer 110 may comprise a web server that is capable of receiving data from client devices 160 and 170 via a network 150 such that server 110 uses network 150 to transmit and display information to a user on display 165 of client device 170. Server 110 may also comprise a plurality of computers that exchange information with different nodes of a network for the purpose of receiving, processing and transmitting data to the client devices. In this instance, the client devices will typically still be at different nodes of the network than any of the computers comprising server 110.

Network 150, and intervening nodes between server 110 and client devices, may comprise various configurations and use various protocols including the Internet, World Wide Web, intranets, virtual private networks, local Ethernet networks, private networks using communication protocols proprietary to one or more companies, cellular and wireless networks (e.g., WiFi), instant messaging, HTTP and SMTP, and various combinations of the foregoing. Although only a few computers are depicted in FIGS. 1-2, it should be appreciated that a typical system can include a large number of connected computers.

Each client device 160 or 170 may be configured similarly to the server 110, with a processor, memory and instructions as described above. Each client device 160 or 170 may be a personal computer intended for use by a person, and have all of the components normally used in connection with a personal computer such as a central processing unit (CPU) 162, memory (e.g., RAM and internal hard drives) storing data 163 and instructions 164, an electronic display 165 (e.g., a monitor having a screen, a touch-screen, a projector, a television, a computer printer or any other electrical device that is operable to display information), and user input 166 (e.g., a mouse, keyboard, touch-screen or microphone). The client device may also include a camera 167, geographical position component 168, accelerometer, speakers, a network interface device, a battery power supply 169 or other power source, and all of the components used for connecting these elements to one another.

Although the client devices 160 and 170 may each comprise a full-sized personal computer, they may alternatively comprise mobile devices capable of wirelessly exchanging data, including position information derived from position component 168, with a server over a network such as the Internet. By way of example only, client device 160 may be a wireless-enabled PDA, a cellular phone, a tablet PC or a netbook capable of obtaining information via the Internet or other network. The user may input information, by way of example, using a small keyboard, a keypad or a touch screen.

Data 134 of server 110 may include may include task priority information 136 and job priority information 138. A job may correspond to different parts of a program that are executing on the network 150, while a task may correspond to a specific action that is performed by a job. Particular jobs and specific tasks within each job may take precedence over other jobs/tasks because the corresponding actions performed are considered to be of greater importance to the overall execution of the program than the actions performed by other jobs/tasks. Accordingly, the task priority information 136 identifies the priority of different tasks and the job priority information 138 identifies the priority of different jobs. As discussed in detail below, the jobs/tasks that are assigned with a higher priority may be performed before jobs/tasks with a lower priority, if possible.

In addition to the operations described below and illustrated in the figures, various operations in accordance with aspects of the invention will now be described. It should also be understood that the following operations do not have to be performed in the precise order described below. Rather, various steps can be handled in a different order or simultaneously.

Figure 3:
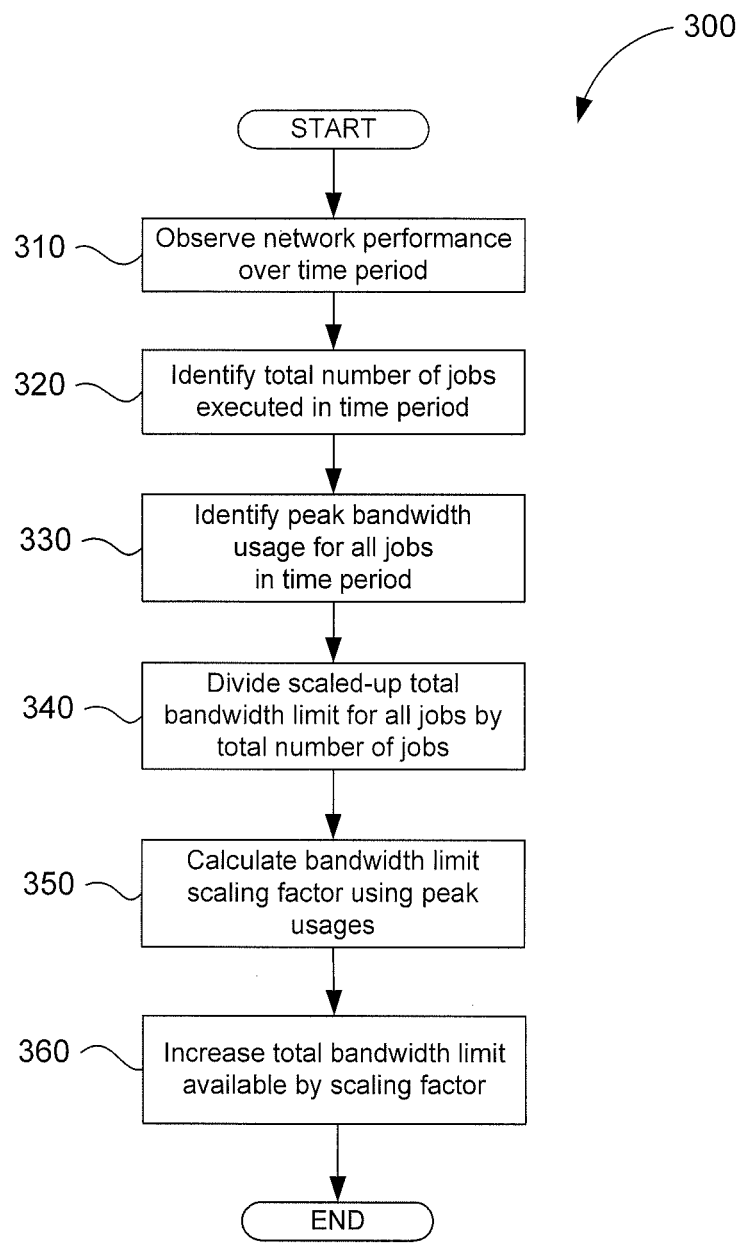
FIG. 3 is an exemplary flow diagram in accordance with aspects of the invention.

FIG. 3 demonstrates a process 300 of allocating bandwidth among multiple jobs that are executing simultaneously using an algorithm. The process begins 300 when a network's performance is observed over a particular time period (step 310). The time period may encompass any segment of time that is characteristic of network activity, for example, from less than one second up to several minutes or more. In one illustrative example, the time period is selected to be on the order of two minutes.

During the time period, the total number of jobs being executed by the network is identified (step 320). Each job may correspond to different parts of the same program or to portions of different programs that are executing on the network. Example jobs include printing a file, saving a file to memory, and outputting a file to a display.

The peak bandwidth usage for all jobs is identified for the time period (step 330). The peak bandwidth usage may not be the total amount of network bandwidth that is occupied by the jobs during the time period because most jobs are not constantly active for any given time period. In other words, some jobs may be executing while other jobs are waiting for the executing jobs to complete execution before the waiting jobs are initiated. This feature of limited data transmission followed by a sudden spike in high data transmission is, as explained above, commonly referred to as "burstiness". In one illustrative example, the total bandwidth available for all of the jobs executing during the time period (i.e., the total bandwidth demand) is 15 gigabytes per second, but the peak bandwidth usage for all of the jobs executing during the time period would most likely be less than 15 gigabytes per second. For example, the peak bandwidth usage for all of the jobs may be 10 gigabytes per second during the time period.

Bandwidth is initially allocated for each job by dividing the scaled-up total bandwidth limit for all jobs by the number of jobs executing during the time period (step 340). In this case, each job is initially allocated substantially the same amount of bandwidth. Using a value of 10 gigabytes per second for the peak bandwidth usage for ten jobs executing during the time period, each job is allocated a bandwidth of 1 gigabyte per second to execute. Accordingly, 5 gigabytes per second of the total bandwidth remains unused during the time period. This unused bandwidth can be leveraged against the bursty characteristic of at least some of the jobs in order to consume available network resources.

Any additional unused bandwidth of the total bandwidth may be allocated to the jobs such that the jobs may execute more efficiently. In one embodiment, each job may be assigned a substantially equal amount of unused bandwidth. However, since different jobs peak at different times, many of the jobs may not utilize a significant amount of the extra amount of bandwidth that is assigned to them. Accordingly, the equal allocation of the extra bandwidth may not be the most effective method of allocating network resources.

To compensate for the fact that different jobs will peak at different times during the time period, the total bandwidth limit may be increased by a scaling factor (k). The scaling factor may be computed in accordance with the following equation (step 350):

$$k = \frac{\text{sum of peak bandwidth demands}}{\text{peak of sum of bandwidth demands}} \qquad \text{Eq. 1}$$

Assume that there are ten jobs executing during the time period, where two of the ten jobs demand a peak bandwidth of 1 gigabyte per second, three of the ten jobs demand a peak bandwidth of 2 gigabytes per second, and five of the ten jobs demand a peak bandwidth of 3 gigabytes per second. Also assume that the peak bandwidth usage for the time period is 10 gigabytes per second. In some embodiments, a peak of the sum of bandwidth demands may be approximated as slightly larger than a peak usage demand (i.e., 1.1×peak usage demand), and the sum of the peak of bandwidth demands is lightly larger than a sum of the peak of bandwidth usages (i.e., 1.1×sum of peak bandwidth usages). Based on these assumptions, the scaling factor is calculated to be:

$$k = \frac{1+1+2+2+2+3+3+3+3+3}{11} = \frac{23}{11} = 2.09 \qquad \text{Eq. 2}$$

The scaling factor is then used to increase the total bandwidth limit available for all of the jobs executing during the time period (step 360). For example, if the total bandwidth demand is 15 gigabytes per second for the ten jobs during the time period, the total bandwidth demand is increased by the scaling factor of 2.09 to a value of 31.35 gigabytes per second. Increasing the total bandwidth limit by the scaling factor ensures that all jobs can be executed during the time period without adversely impacting the execution of any of the jobs due to unavailable network resources.

Figure 4:
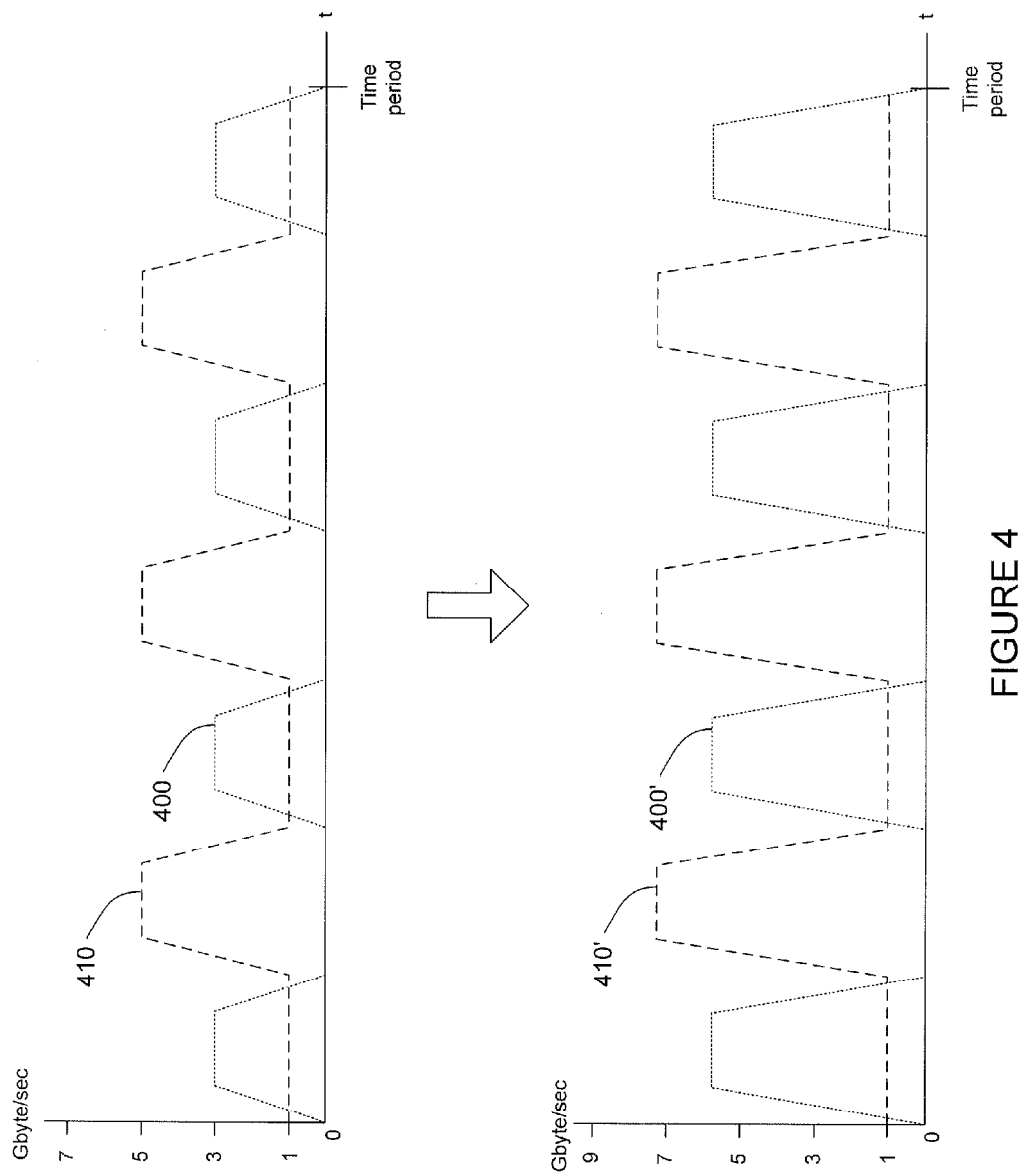
FIG. 4 illustrates a graph of job signals before and after bandwidth is allocated in accordance with aspects of the invention.

FIG. 4 illustrates a pair of graphs of two job signals before and after bandwidth is allocated by leveraging the burstiness characteristic of the signals to more efficiently utilize network resources. Referring to the upper graph, two different job signals 400, 410 are illustrated. Each signal 400, 410 transmits data at a high rate for a time interval and then transmits data at a relatively lower rate (or not at all) during a different time interval. In some cases, the burstiness of the signals 400, 410 may be because data could not be transmitted due to insufficient network bandwidth. In other cases, the burstiness of the signals 400, 410 may be because data could not be transmitted until another job completed execution.

As shown in the upper graph, job signal 400 begins at time t=0 at a data transmission rate that is zero gigabytes per second. The rate at which signal 400 is transmitting data increases until 3 gigabytes per second is reached. This rate is maintained for an interval before the data transmission rate decreases to zero. No data is transmitted by job signal 400 for an interval before transmission resumes as in the previous transmission interval. The job signal 400 continues to exhibit these bursty characteristics in a cycle until the time period elapses.

Similarly, job signal 410 begins at time t=0 at a data transmission rate of 1 gigabyte per second. The rate at which signal 410 is transmitting data is maintained for an interval before the data transmission rate increases to a rate of 5 gigabytes per second. This rate is maintained for an interval before the data transmission rate decreases to 1 gigabyte per second. The job signal 410 continues to exhibit this cyclical bursty characteristic until the time period elapses.

In accordance with embodiments of the invention, the bursty characteristic of the signals 400, 410 may be leveraged to increase the efficiency of network resources using the process described with reference to FIG. 3. The peak bandwidth usage for job signal 400 is 3 gigabytes per second and the peak bandwidth usage for job signal 410 is 5 gigabytes per second. When job signal 400 is transmitting data at 3 gigabytes per second, job signal 410 is transmitting data at 1 gigabyte per second. In other words, the peak bandwidth usage during this time interval is 4 gigabytes per second. Accordingly, the peak bandwidth usage for all jobs that are executing during the total time period is 5 gigabytes per second, and the sum of peak bandwidth demand for all jobs is 8 gigabytes per second (i.e., 5 gigabytes per second+3 gigabytes per second=8 gigabytes per second). The peak of the sum of bandwidth demands may be calculated by multiplying the peak bandwidth usage of 5 gigabytes per second by 1.1 to obtain a value of 5.5. Thus, the scaling factor is equal to 8/5 or 1.6.

As shown in the figure, the total bandwidth demand is 5 gigabytes per second. This is the maximum amount of bandwidth that is required at any given time during the time period. The total bandwidth demand value is multiplied by the scaling factor to determine a new value for the total bandwidth demand. In other words, the new value for the total bandwidth demand becomes 1.45×5 or 7.25 gigabytes per second for all jobs executing during the time period.

Referring to the lower graph in FIG. 4, the data transmission rate of signal 410 can be increased up to 7.25 gigabytes per second (see signal 410') when a data burst is transmitted. When transmitting at the new total bandwidth demand value, data transmission is not adversely affected because the only other job (i.e., signal 400) is not transmitting any data during the same interval.

In some embodiments, as shown in the lower graph, signal 410 may not be increased for the portions that do not exhibit bursty characteristics. For example, the lowest rate at which job signal 410 transmits data is 1 gigabyte per second. When the bursty portion of signal 410 is increased to form signal 410', the low data transmission rate may be maintained at 1 gigabyte per second.

In other embodiments, signal 410 may be decreased for the portions that do not exhibit bursty characteristics. For example, the lowest rate at which job signal 410 transmits data is 1 gigabyte per second. When the bursty portion of signal 410 is increased to form signal 410', the low data rate may be reduced down to zero gigabytes per second (see signal 410" in FIG. 5). In this case, data that was transmitted during the 1 gigabyte per second transfer rate of signal 410 may be prevented from being transmitted until the bursty portion of signal 410" is used to transmit the data.

The data transmission rate of the bursty portion of signal 400 may also be increased without interfering with the execution of other jobs on the network (i.e., because the signal 410' does not exhibit bursty characteristics during the same interval.) For example, in the event that the non-bursty portion of signal 400' remains at 1 gigabyte per second, the bursty portion of signal 400 may be increased up to 6.25 gigabytes per second (see signal 400').

The data transmission rate of a signal that is exhibiting burstiness may be further increased by decreasing the data transmission rate of a signal that is not exhibiting bursty characteristics during the same interval. Signal 400 may be increased more than signal 400' if the non-bursty portion of signal 410 is reduced as long as the two signals together do not exceed the new value for the total bandwidth limit. In other words, the data transmission rate of signal 400 can be increased when a data burst is transmitted without adversely affecting network performance because the non-bursty portion of signal 410 is utilizing less network bandwidth.

Figure 5:
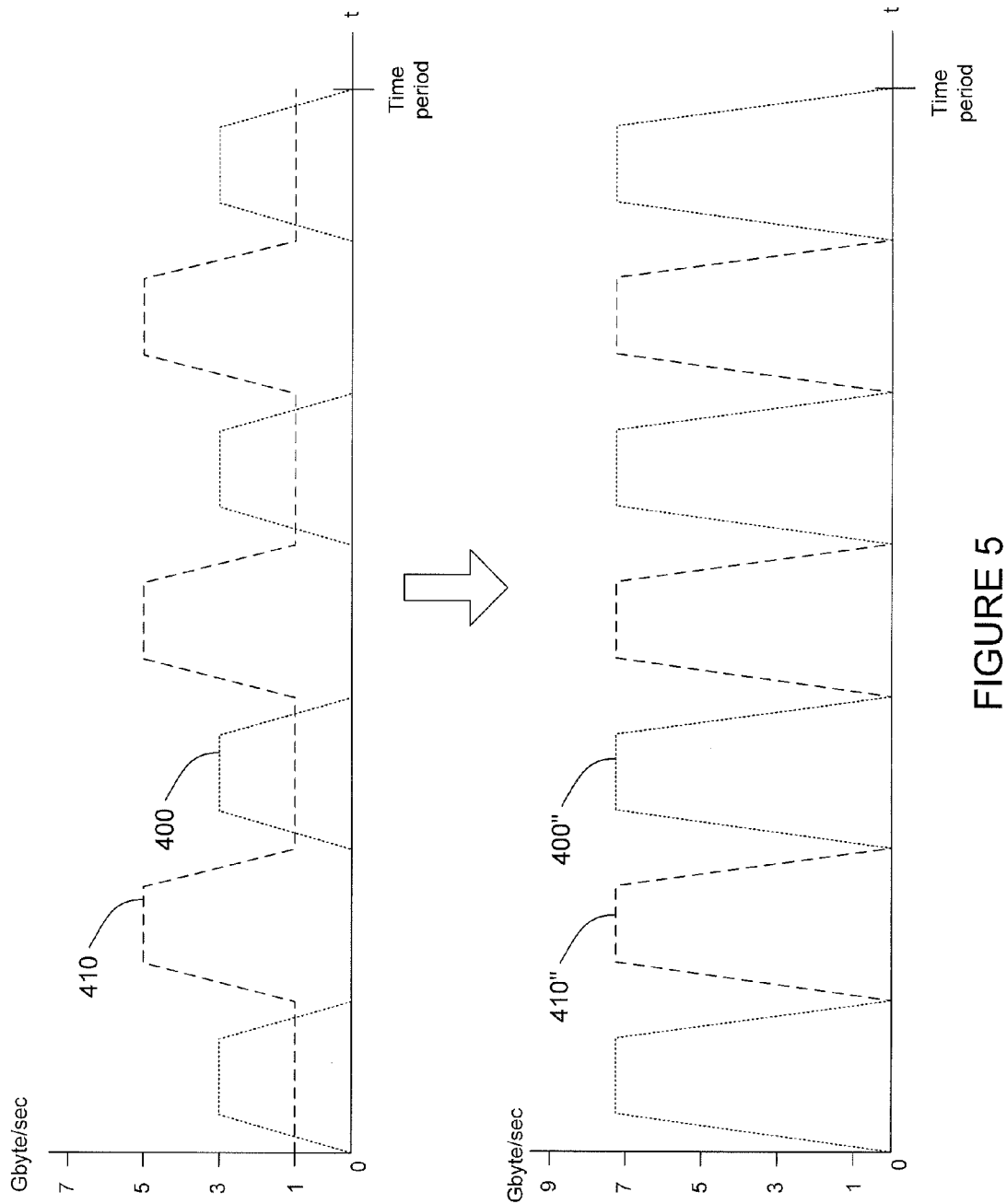
FIG. 5 illustrates another graph of job signals before and after bandwidth is allocated in accordance with aspects of the invention.

As illustrated in FIG. 5, signal 400 may be increased up to 7.25 gigabytes per second (as indicated by signal 400") if signal 410 is reduced to zero gigabytes per second (as indicated by signal 410") during the same time interval. Accordingly, a data transmission rate may be increased when a signal exhibits burstiness and decreased when a signal does not exhibit burstiness in order to provide for the efficient utilization of available network bandwidth.

In the examples described above with reference to FIGS. 4-5, two data transmission signals are described. However, it is understood that more than two signals would commonly be executing simultaneously. In these cases, the signals may be prioritized to identify which signals should be addressed first to increase the data transmission rates of the higher priority signals, before adjusting the data transmission rates of lower priority signals. The concept of prioritization is discussed in detail below with reference to FIG. 7.

Figure 6:
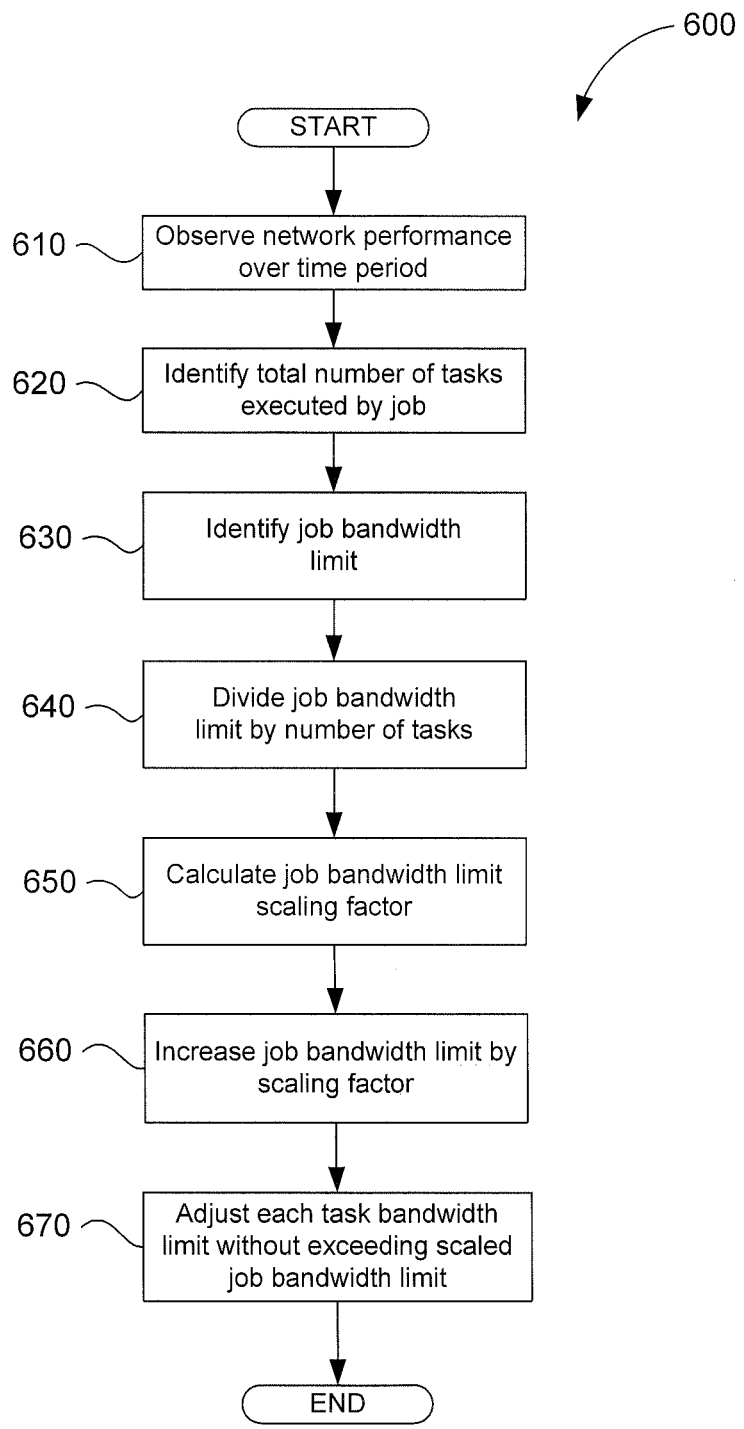
FIG. 6 is an exemplary flow diagram in accordance with aspects of the invention.

FIG. 6 demonstrates a process 600 using an algorithm to allocate bandwidth among multiple, simultaneously executing tasks of a particular job. Process 600 is similar to process 300, but process 300 is directed to job signals while process 600 is directed to task signals. A task commonly refers to a single computation or action performed on a network. Many tasks may comprise a single job. For example, one task may be to retrieve a data value, another task may be to perform an operation on the value, and still another task may be to output the value to another job. In another example, one task may be to continually increment a data value as a function of time, another task may be to determine whether a data value exceeds a threshold, still another task may be to perform an action on the value, and yet another task may be to store the value in memory.

The process begins 600 when network performance is observed over a particular time period (step 610). The time period may encompass any segment of time that is characteristic of network activity. The time period may be the same observation period discussed above with reference to FIG. 3 (e.g., on the order of two minutes or some other time period).

In one illustrative example, hundreds of tasks are executing on the same network. However, most of the tasks are not constantly transferring data. For example, one task may not transfer any data for a few seconds but may then suddenly transmit 1 gigabyte of data during the next second and then not transmit any data thereafter for another few seconds. As discussed above, this type of sudden high data transmission rate preceded or followed by little or no data transmission is referred to as "burstiness". The burstiness of a data transmission signal may be leveraged to increase effective network bandwidth allocation.

During the time period, the total number of tasks being executed by the network is identified for a particular job (step 620). As stated, there may be hundreds of tasks executing for any given job. However, for ease of description, the number of tasks for process 600 is identified as five.

The peak bandwidth limit allocated for the job that performs the tasks (i.e., the "job bandwidth limit") is identified for the time period (step 630). The job bandwidth limit may be the scaled bandwidth for the job as described with reference to step 360 in FIGS. 4-5. In one illustrative example, a job bandwidth limit may be 5 gigabytes per second.

Bandwidth is initially allocated for each task by dividing the job bandwidth limit by the number of tasks for the job executing during the time period (step 640). In this case, each task is initially allocated substantially the same amount of bandwidth. Using the values of five tasks executing during the time period and a job bandwidth limit of 5 gigabytes per second, each task is allocated a bandwidth of 1 gigabyte per second.

Since most task signals do not transmit data at a constant rate, the job bandwidth limit will not be completely utilized during the time period. Any unused bandwidth may be allocated to the tasks such that the tasks may have more network resources available in which to execute more effectively. Specifically, the unused bandwidth can be leveraged against the bursty characteristic of at least some of the tasks in order to consume the unused bandwidth.

To compensate for the fact that different tasks will peak at different times during the time period, the job bandwidth limit may be increased by a scaling factor (k). The scaling factor may be computed in accordance with the following equation (step 650):

$$k = \frac{\text{sum of peak bandwidth demands}}{\text{peak of sum of demands}} \qquad \text{Eq. 3}$$

In the illustrative example, five tasks are executing during the time period, where two of the tasks demand a peak bandwidth of 250 megabytes per second and three of the tasks demand a peak bandwidth of 500 megabytes per second. Also, the peak of the sum of demands for the time period may be calculated by multiplying the peak job usage of 1 gigabyte per second for the time period by a number slightly larger than 1 (e.g., 1.1). In this case, a value of 1.1 gigabytes per second is obtained. Based on these values, the scaling factor is calculated to be:

$$k = \frac{.25 + .25 + .5 + .5 + .5}{1.1} = \frac{2}{1.1} = 1.81 \qquad \text{Eq. 4}$$

The scaling factor is then used to increase the job bandwidth limit available for all of the tasks executing during the time period (step 660). For example, if the job bandwidth limit is 1.25 gigabytes per second for the five tasks during the time period, the job bandwidth limit is increased by the scaling factor of 1.81 to a value of 2.26 gigabytes per second. Increasing the job bandwidth limit by the scaling factor ensures that all tasks can be executed during the time period while efficiently using available network resources without adversely impacting the execution of any of the tasks.

The bandwidth limit of each task is then adjusted such that the total adjusted bandwidth for all of the tasks does not exceed the scaled job bandwidth limit (step 670). Each of the five tasks was initially allocated a bandwidth of 1 gigabyte per second in step 640. This value is adjusted for each task such that a larger portion of the increased job bandwidth limit may be utilized. In one example, the data transmission rate of each task may be increased by the same amount until all of the increased job bandwidth is utilized. In another example, each task may be assigned a priority value, and the tasks with higher priority values may have their data transmission rates increased before those with lower priority values until all of the increased job bandwidth is utilized. In another example, the tasks with lower priority values may have their data transmission rates decreased such that the tasks with higher priority values may have their data transmission rates further increased.

Figure 7:
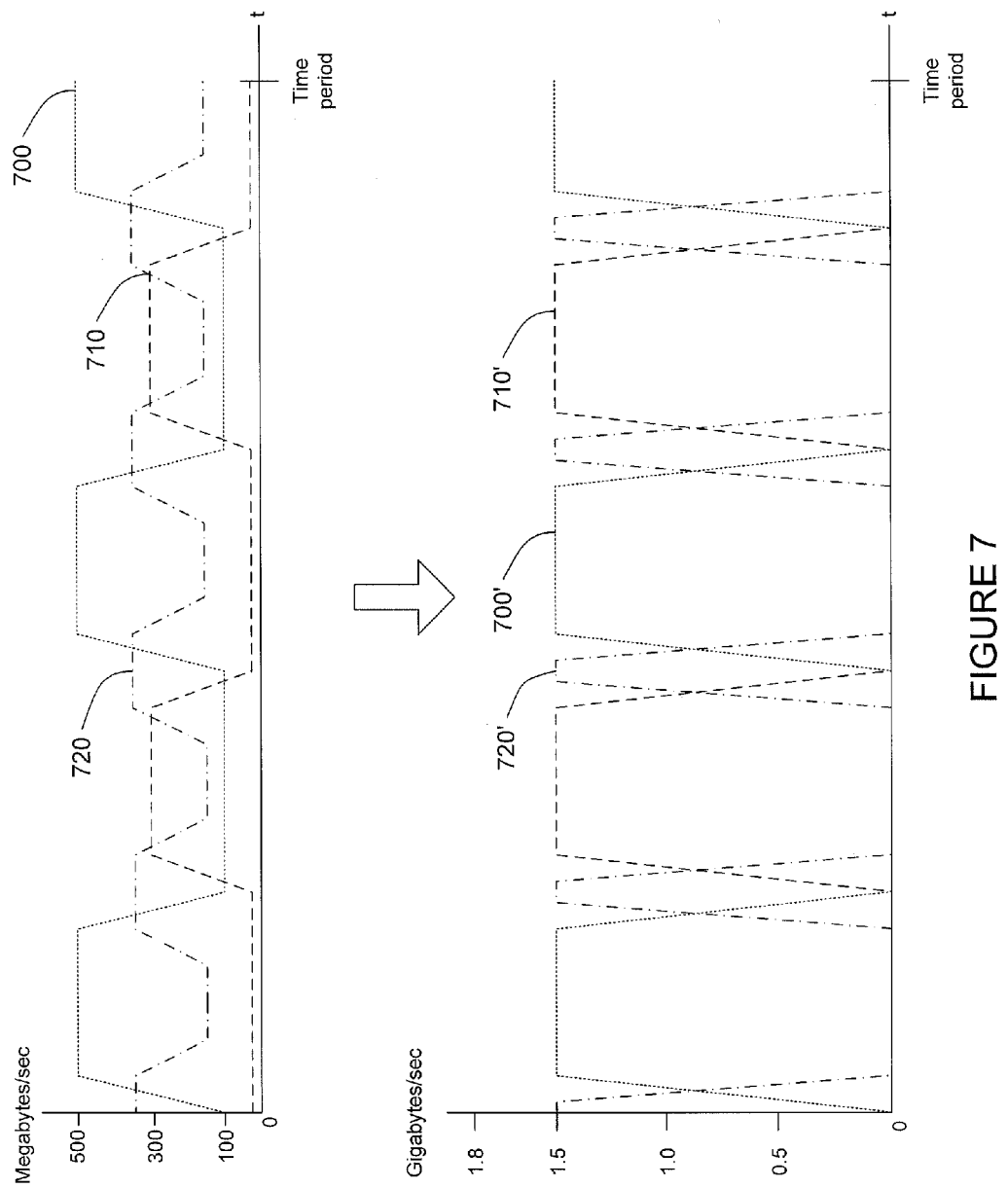
FIG. 7 illustrates a graph of task signals before and after bandwidth is allocated in accordance with aspects of the invention.

FIG. 7 illustrates graphs of three task signals before and after bandwidth is allocated to leverage the burstiness characteristic of the signals to more efficiently utilize network resources. For purposes of discussion, a job includes different tasks as illustrated by task signals 700, 710, 720. As shown in the upper graph, task signal 700 begins at time t=0 at a data transmission rate of 100 megabytes per second. The rate at which signal 700 is transmitting data increases until a rate of 500 megabytes per second is reached. This rate is maintained for an interval before the data transmission rate decreases to 100 megabytes per second. The task signal 700 continues to exhibit these bursty characteristics until the time period elapses.

Similarly, task signal 710 begins at time t=0 at a data transmission rate of 25 megabytes per second. As shown in the graph, the rate at which signal 710 is transmitting data is maintained for an interval before the data transmission rate increases to a rate of 300 megabytes per second. This rate is maintained for an interval before the data transmission rate decreases to 25 megabytes per second. The task signal 710 continues to exhibit this cyclical bursty characteristic until the time period elapses.

Task signal 720 begins at time t=0 at a data transmission rate of 350 megabytes per second. As shown in the graph, the rate at which signal 720 is transmitting data is maintained for an interval before the data transmission rate decreases to a rate of 150 megabytes per second. This rate is maintained for an interval before the data transmission rate increases to 350 megabytes per second. The task signal 720 continues to exhibit these cyclical features until the time period elapses.

The peak bandwidth usage for task signal 700 is 500 megabytes per second, the peak bandwidth usage for task signal 710 is 300 megabytes per second and the peak bandwidth usage for task signal 720 is 350 megabytes per second. When task signal 700 is transmitting data at 500 megabytes per second, task signal 710 is transmitting data at 25 megabytes per second and task signal 720 is transmitting data at a rate of between 150-350 megabytes per second. In other words, the peak bandwidth usage for the job during this time interval is 875 megabytes per second.

In accordance with embodiments of the invention, the bursty characteristic of task signals 700, 710, 720 may be leveraged to increase the efficiency of network resources using the process described with reference to FIG. 6. For purposes of discussion, the task signals 700, 710, 720 are executed during the processing of a job signal that has a peak bandwidth allocation value of 1.5 gigabytes per second with a peak job usage of 875 megabytes per second (as identified above with reference to signals 700, 710, 720). The peak bandwidth allocation value is divided by the number of tasks associated with the job (here, three) to provide the initial bandwidth value that is allocated to each task. In other words, each task signal 700, 710, 720 is initially allocated bandwidth of 0.5 gigabytes per second.

The job bandwidth limit scaling factor is calculated using Equation 3. The sum of the peak bandwidth demand for all tasks is equal to 500+300+350=1150 megabytes per second=1.15 gigabytes per second. The peak of the sum of bandwidth demands is slightly larger than peak job usage such that the peak of the sum of bandwidth demands may be 1.1× 875=962 megabytes per second=0.96 gigabytes per second. Accordingly, the scaling factor is equal to 1.15/0.96 or 1.2.

The scaling factor value k=1.2 is used to increase the total job bandwidth limit. As stated above, the total job bandwidth limit is 1.5 gigabytes per second. Accordingly, this limit is increased using the scaling factor to 1.8 gigabytes per second.

The data transmission rate of each task signal is adjusted such that the scaled total job bandwidth limit is not exceeded. In other words, the data transmission rate of all of the tasks cannot exceed 1.8 gigabytes per second. Each task signal 700, 710, 720 was initially allocated the same amount of bandwidth (0.5 gigabytes per second). This value may be adjusted up or down to any value as long as the total data transmission rate for all tasks does not exceed 1.8 gigabytes per second.

In one embodiment, the data transmission rate of each task is increased by the same amount until all of the job bandwidth is utilized. In other embodiments, as discussed below, each task may be assigned a priority value, and the tasks with higher priority values may have their data transmission rates increased before those with lower priority values until all of the job bandwidth is utilized. Alternatively or additionally, the tasks with lower priority values may have their data transmission rates decreased such that the tasks with higher priority values may have their data transmission rates further increased.

As stated, the different task signals that are executing simultaneously and vying for network resources may each be provided a priority such that the data transmission rates may be altered based on the priority. In one case, certain types of data transmission signals may be assigned a higher priority than other signals because the data that they are transmitting or receiving is deemed to be of greater importance. This priority assignment may be performed at the design stage such that the network automatically identifies the priority. In another case, the characteristics of the data transmission signal itself determine its priority. For example, a signal that generally exhibits higher data transmission rates may be automatically assigned a higher priority than a signal that generally transfers data at lower rates. For ease of description, we assume that signal 700 has a higher priority than signal 710, and that signal 710 has a higher priority than signal 720.

Referring to the lower graph of FIG. 7, the total job bandwidth limit is 1.8 gigabytes per second. The task signals 700, 710, 720 can be adjusted in any number of ways to utilize the newly available bandwidth more effectively. For example, task signal 700 may be increased to 1.5 gigabytes per second resulting in adjusted task signal 700'. In addition, the bursty portion of task signal 710 (having the second highest priority) may also be increased to 1.5 gigabytes per second while the non-bursty portion of task signal 710 may be decreased to a value of zero, resulting in adjusted task signal 710'. Lastly, task signal 720 (having the lowest priority) may be adjusted to utilize any remaining available job bandwidth limit. One way to achieve this may be to increase the bursty portion of task signal 720 to 1.5 gigabytes per second while decreasing the non-bursty portion of task signal 720 to a value of zero, resulting in adjusted task signal 720'.

The adjusted task signals 700', 710', 720' all have a maximum data transmission of 1.5 gigabytes per second. This feature may be beneficial in some cases; however, other cases may warrant that the higher priority signals transmit data at a higher maximum rate than lower priority signals.

As described above, bandwidth is allocated by leveraging a bursty characteristic of data transmission signals to efficiently utilize network resources. Network performance is observed over a time period to identify patterns of data transmission rates as the different signals are processed. The bandwidth allocation is performed based on the observed behavior of the signals over the course of the time period. To compensate for the fact that different jobs/tasks peak at different times during the time period, the total bandwidth limit may be increased by a scaling factor. The scaling factor is calculated using information obtained by observing network performance during the time period. The scaling factor is then used to increase the total bandwidth available for all jobs/tasks executing during the time period without exceeding any bandwidth limits. The data transmission rate of each job/task may then be adjusted to utilize the newly available bandwidth.

As these and other variations and combinations of the features discussed above can be utilized without departing from the invention as defined by the claims, the foregoing description of exemplary embodiments should be taken by way of illustration rather than by way of limitation of the invention as defined by the claims. It will also be understood that the provision of examples of the invention (as well as clauses phrased as "such as," "e.g.", "including" and the like) should not be interpreted as limiting the invention to the specific examples; rather, the examples are intended to illustrate only some of many possible aspects.

The invention claimed is:

1. A computer-implemented method comprising:
observing, by a processor, execution of data transmission signals over a predetermined time period, wherein at least some of the data transmission signals exhibit bursty characteristics;
identifying a peak bandwidth usage of all data transmission signals and a peak bandwidth demanded by each data transmission signal during the time period;
dividing the peak bandwidth usage by a total number of different data transmission signals that are executing during the time period;
calculating a total bandwidth demand scaling factor (k) using a peak (U) of the sum of bandwidth demands and a sum (P) of the peak bandwidth demands for the data transmission signals, wherein the scaling factor (k) is calculated according to the equation $$k = \frac{P}{U},$$

and where P>U; and
increasing, using the processor, a total bandwidth limit for the data transmission signals using the scaling factor.

2. The method of claim 1, wherein the data transmission signals are job signals, each job signal corresponding to a portion of a program executing on a network.

3. The method of claim 1, wherein the data transmission signals are task signals associated with a job signal, each task signal corresponding to an action performed on a network.

4. The method of claim 1, further comprising:
initially allocating a bandwidth limit for each data transmission signal using a quotient resulting from dividing the peak bandwidth usage by the total number of different data transmission signals; and adjusting the initially allocated bandwidth limit for each data transmission signal, wherein a total of the adjusted bandwidth limit for all of the data transmission signals does not exceed the increased total bandwidth limit.

5. The method of claim 4, wherein the adjusting further comprises:
increasing a bursty portion of at least some of the data transmission signals.

6. The method of claim 5, wherein each data transmission signal is associated with a priority value, and the adjusting further comprises:
increasing the bursty portion of a first one of the data transmission signals having a higher priority value before increasing the bursty portion of a second one of the data transmission signals having a lower priority value.

7. The method of claim 5, wherein the adjusting further comprises:
decreasing a non-bursty portion of at least some of the data transmission signals.

8. The method of claim 7, wherein each data transmission signal is associated with a priority value, and the adjusting further comprises:
decreasing the non-bursty portion of a first one of the data transmission signals having a lower priority value before decreasing the non-bursty portion of a second one of the data transmission signals having a higher priority value.

9. A computer-implemented method comprising:
observing network execution of task signals over a predetermined time period, wherein at least some of the task signals transmit data at varying rates during the time period, each task signal being associated with a job signal and corresponding to an action performed on the network, wherein the job signal corresponds to a portion of a program executing on the network;
identifying a total job bandwidth limit of all task signals, a peak bandwidth job usage of all task signals, and a peak bandwidth demanded by each task signal during the time period;
initially allocating a bandwidth limit for each task signal by dividing the total job bandwidth limit by a total number of different task signals that are executing during the time period;
calculating a bandwidth job limit scaling factor (k) using a peak (U) of the sum of bandwidth demands and a sum (P) of the peak bandwidth demands for the task signals, wherein the scaling factor (k) is calculated according to the equation $$k = \frac{P}{U},$$

and where P>U;
increasing the total bandwidth job limit by the scaling factor; and
adjusting the initially allocated bandwidth limit for each task signal, wherein a total of the adjusted bandwidth allocation limit for all of the task signals does not exceed the increased total bandwidth job limit.

10. The method of claim 9, wherein the adjusting further comprises:
increasing a bursty portion of at least some of the task signals.

11. The method of claim 10, wherein each task signal is associated with a priority value, and the adjusting further comprises:
increasing the bursty portion of a first one of the task signals having a higher priority value before increasing the bursty portion of a second one of the task signals having a lower priority value.

12. The method of claim 10, wherein the adjusting further comprises:
decreasing a non-bursty portion of at least some of the task signals.

13. The method of claim 12, wherein each task signal is associated with a priority value, and the adjusting further comprises:
decreasing the non-bursty portion of a first one of the task signals having a lower priority value before decreasing the non-bursty portion of a second one of the task signals having a higher priority value.

14. A computer-implemented method comprising:
observing network execution of job signals over a predetermined time period, wherein at least some of the job signals transmit data at varying rates during the time period, each job signal corresponding to a portion of a program executing on a network;
identifying a peak bandwidth usage of all job signals and a peak bandwidth demanded by each job signal during the time period;
initially allocating a bandwidth limit to each job signal by dividing the peak bandwidth usage all job signals by a total number of different job signals that are executing during the time period;
calculating a total bandwidth demand scaling factor (k) using a peak (U) of the sum of bandwidth demands and a sum (P) of the peak bandwidth demands for the job signals, wherein the scaling factor (k) is calculated according to the equation $$k = \frac{P}{U},$$

and where P>U;
increasing a total bandwidth limit for the job signals using the scaling factor; and
adjusting the initially allocated bandwidth limit for each job signal, wherein the adjusted bandwidth limit for all of the job signals does not exceed the increased total bandwidth limit.

15. The method of claim 14, wherein the adjusting further comprises:
increasing a bursty portion of at least some of the job signals.

16. The method of claim 15, wherein each job signal is associated with a priority value, and the adjusting further comprises:
increasing the bursty portion of a first one of the job signals having a higher priority value before increasing the bursty portion of a second one of the job signals having a lower priority value.

17. The method of claim 15, wherein the adjusting further comprises:
decreasing a non-bursty portion of at least some of the job signals.

18. The method of claim 17, wherein each job signal is associated with a priority value, and the adjusting further comprises:

decreasing the non-bursty portion of a first one of the job signals having a lower priority value before decreasing a non-bursty portion of a second one of the job signals having a higher priority value.

* * * * *